T. F. MULLIGAN.
BORING TOOL.
APPLICATION FILED DEC. 20, 1911.
1,102,538.
Patented July 7, 1914.
3 SHEETS—SHEET 1.
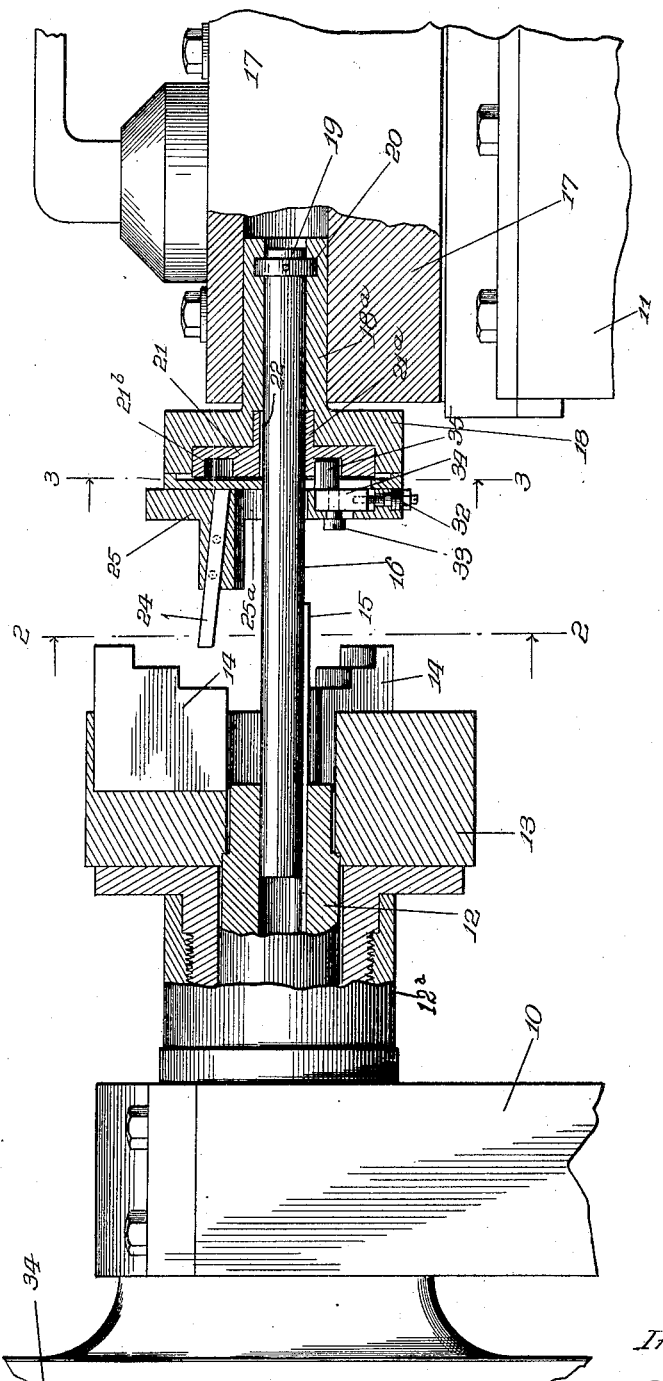

T. F. MULLIGAN.
BORING TOOL.
APPLICATION FILED DEC. 20, 1911.
1,102,538.
Patented July 7, 1914.
3 SHEETS—SHEET 2.
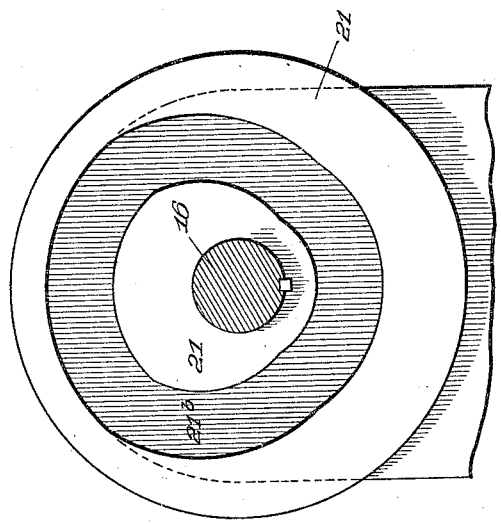
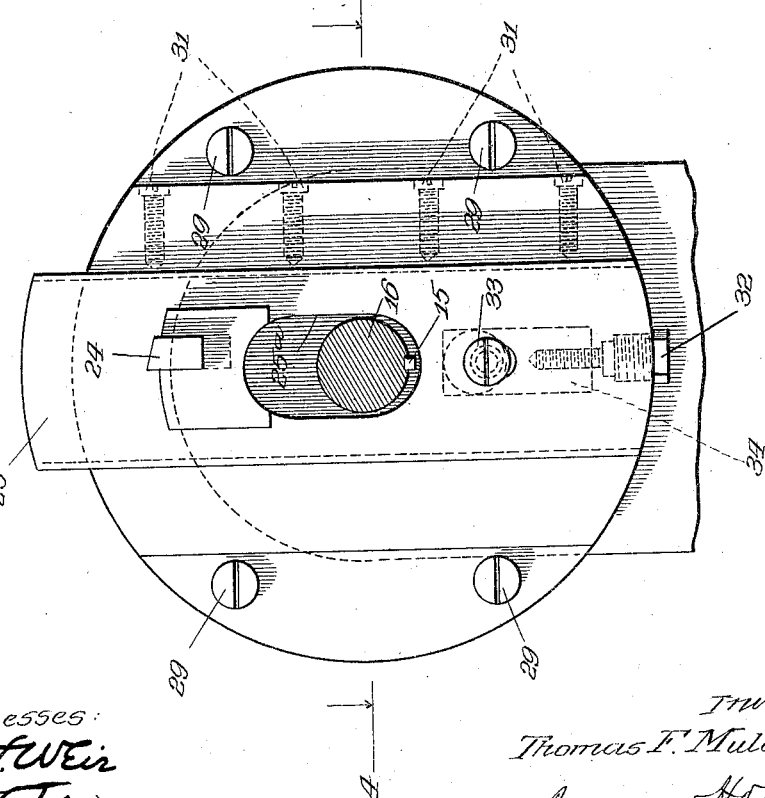

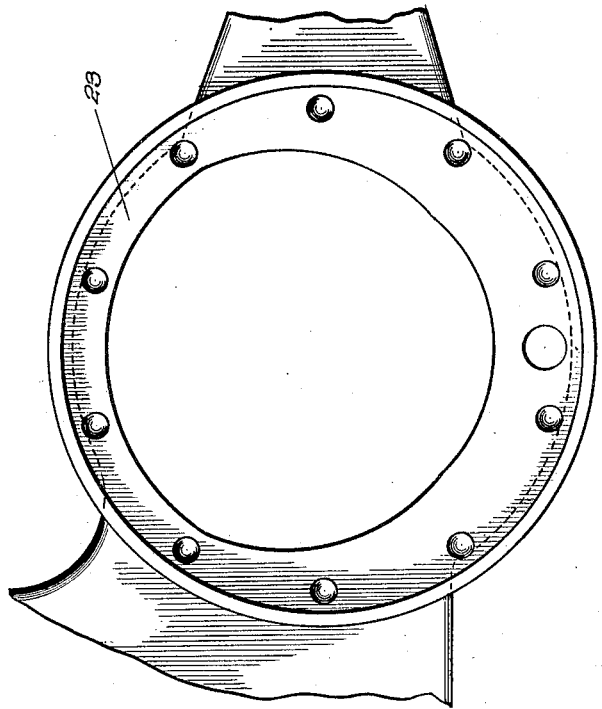
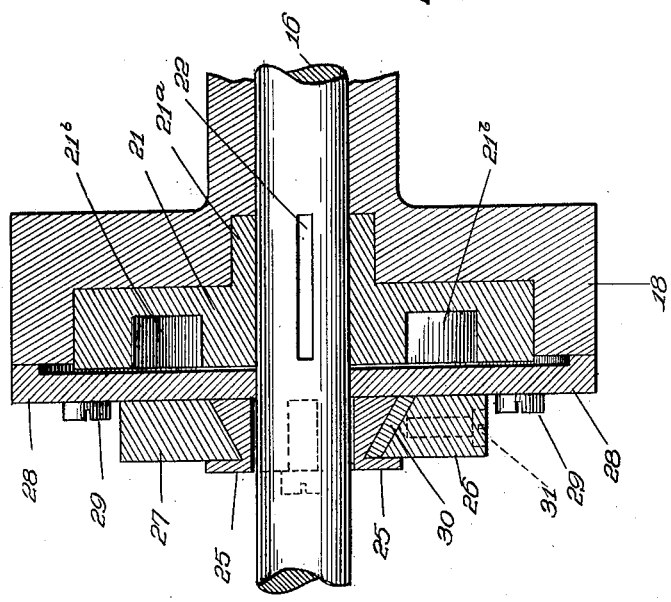

UNITED STATES PATENT OFFICE.

THOMAS F. MULLIGAN, OF FORT WAYNE, INDIANA, ASSIGNOR TO S. F. BOWSER & COMPANY, INC., OF FORT WAYNE, INDIANA, A CORPORATION OF INDIANA.

BORING-TOOL.

1,102,538.   Specification of Letters Patent.   Patented July 7, 1914.

Application filed December 20, 1911.   Serial No. 666,924.

*To all whom it may concern:*

Be it known that I, THOMAS F. MULLIGAN, a citizen of the United States, residing at Fort Wayne, in the county of Allen and State of Indiana, have invented certain new and useful Improvements in Boring-Tools, of which the following is a specification.

The invention relates to boring tools particularly adapted to bore the irregular interior portion of a master casing of the type embodied in application for patent of Allen A. Bowser, Serial No. 439,397, filed June 19, 1908, for combined meter and valve. In the barrel or casing of a meter constructed according to the invention described in the said application the bore or interior portion of the same is of such form that when measured through the diameter of the hub of the piston, which is eccentrically mounted in the casing, the internal distances will always be equal.

The object of the invention is to provide an improved mechanism which may be readily attached to an ordinary boring tool for boring the irregular inner surfaces of the casing of a meter of the class described at a single operation.

Other objects of the invention are hereinafter described and claimed and shown in the accompanying drawings forming part of this specification.

In the said drawings Figure 1 is a view in side elevation of a lathe to which the device is shown applied, a portion of the mechanism being in longitudinal section in order to disclose the details of construction. Fig. 2 is an end elevation of the boring tool, the view taken approximately on line 2—2 of Fig. 1, looking in the direction indicated by the arrows. Fig. 3 is a sectional view through the device on line 3—3 of Fig. 1. Fig. 4 is a sectional view on line 4—4 of Fig. 2; and Fig. 5 is a view of the meter casing or barrel of the type referred to, which is adapted to have its interior bored in the form shown by the device of the invention.

In Fig. 1 portions of the main frame of a lathe or boring machine to which the invention is shown applied are illustrated, the same being indicated by the reference characters 10 and 11 respectively, the portion 10 being a bearing, into which is journaled a shaft or mandrel as indicated at 12, usually adapted to be power-driven, and carrying the usual lathe chuck 13, being of the expanded jaw type adapted to grip and retain during the boring operation the meter casings to be bored. A plurality of jaws similar to those indicated by the reference character 14 are provided, following the usual practice and constituting no part of the invention. The mandrel or spindle 12 has an outer integral spaced peripheral portion indicated at $12^a$, Fig. 1, on the interior of which the chuck 13 is screw-threaded for convenience of attachment. The mandrel or shaft 12 is hollow and is provided on its interior portion with a key indicated at 15, the same being adapted to coöperate with the groove in shaft 16 slidably mounted in the hollow mandrel or shaft 12, in order to have longitudinal movement in relation thereto but being positively driven thereby. The opposite end of the shaft 16 is rotatably supported in a turret 17 by being journaled in the interior or tubular portion $18^a$ of the boring tool supporting member 18, which is provided with an expanded and circumferentially flanged head. Within the shank or tubular portion $18^a$ of the tool head 18, which is rigidly secured to the movable turret 17 of the lathe, is a suitable groove adapted to receive a collar which may be secured to the extremity of shaft 16 by a pin as indicated at 19, the collar being designated by the reference character 20. The pin 19 may be inserted into the collar and shaft and placed in position within the hub portion $18^a$ of the head 18 by passing the pin through a hole through the walls of $18^a$. In order to secure the collar 20 in its position within the tubular portion $18^a$ of the tool head it may be formed of the open type in order that it may be contracted to enter the same size opening as the shaft 16 and afterward contracted by reason of the flexibility of the material therein into the groove, after which the shaft 16 may be passed through the expanded ring 20 and the parts locked together by passing the pin through the collar into the shaft. This construction, it will be seen, secures the shaft 16 to the lathe chuck in such manner that it will be constantly rotated thereby and at the same time will be rotatably mounted in relation to the tool head 18, but secured thereto so that any longitudinal movement of the tool head imparted thereto by longitudinal movement of the turret 17 may be imparted to the shaft, which may slide freely in relation to the mandrel 12 of the chuck.

The head portion of the tool supporting member 18 extending beyond the turret adjacent the chuck carries on its flanged interior a pattern member 21, which is journaled to rotate on the circumferential interior of tool head 18, and is provided with an elongated hub portion as indicated at 21ª extending into a suitable recess or opening in the tool head in order to give the pattern member 21 a sufficient bearing in order that it may be securely keyed to rotate with shaft 16, a key for this purpose being indicated by the reference character 22. The pattern member 21 has an irregular peripheral groove 21ᵇ corresponding to the shape of the interior surface desired in the meter casing or barrel, which latter is indicated by the reference character 23, Fig. 5.

The cutting tool is indicated by the reference character 24 and is secured to a slotted supporting member 25. The member 25 is provided with a vertical slot as indicated at 25ª, through which passes the shaft 16. Support for the member 25 and the tool carried thereby is afforded by reason of two parallel retaining members 26, 27, which have their adjacent inner surfaces beveled so that they converge outwardly from the surface of the plate 28, to which they are secured, and which in turn is secured to the flanged head portion of the tool support 18 over the pattern member 21 by a plurality of retaining screws as indicated at 29. The coöperating parallel sides of the tool supporting member 25 are grooved, as illustrated particularly in sectional view Fig. 4. A plate of suitable bearing material as indicated at 30 is shown interposed between beveled member 26 and tool-carrying member 25. A plurality of screws is indicated at 31 provided for adjustment between the guide member 26 and bearing member 30 and enables any looseness between the reciprocating member 25 and its supporting parts to be taken up. The tool-carrying member 25 has adjustably secured to it by means of screws 32, 33 a block 34, carrying a roller 35 coöperating with groove 21ᵇ and pattern member 21. When a casting that is desired to have its interior bored is placed in position on the chuck and secured thereto in the usual or any desired manner as by gripping it between the jaws 14, it will be rotated when rotation is imparted to the mandrel or hollow shaft 12 through the driving wheel 34, a broken portion only of which is shown. With the chuck keyed shaft 16 will also rotate and rotation at the same time will also be imparted to the pattern member 21 within its stationary tool supporting member 18. The roller 35 connected with the member 25 will be caused to follow the pattern groove 21ᵇ, which will move the tool 24 in accordance with the outline of said groove. Since the pattern member 21 will rotate in unison with the chuck carrying the casing or barrel of the meter to be bored, as the lathe is operated the tool will continue to traverse the same path at each revolution of the chuck and the interior surface of the casing or barrel casting will be bored according to the outline of the groove 21ᵇ in the pattern, which will be the shape desired for the interior of the meter casing.

The adjustable connection of the roller 35 with the tool-carrying member 25 is for the purpose of correctly positioning the tool 24 with respect to the casting to be bored before starting the boring operation, which may be necessary by reason of any wear or variation in the tool itself or by wear or variation in the various parts of the tool, while any looseness between the tool-supporting member 25 and the member 28 upon which it is carried may be taken up by adjusting the screws 31 as described.

In order that the invention might be understood, the details of the preferred embodiment have been described, but it is not desired to be limited to the exact details herein.

I claim:

1. In a boring tool, for boring meter casings and the like, the combination with a rotating chuck spindle, of a boring tool, means permitting a feeding movement of the boring tool longitudinally of the axis of the chuck spindle comprising a tool supporting member, a stationary housing to which the said tool supporting member is secured to reciprocate at approximately right angles to the axis of the chuck spindle, a shaft secured to rotate with the chuck spindle and having a portion thereof journaled in the axis of the said housing, a pattern member supported by the said shaft within the housing and rotatably secured thereto, said pattern member being provided with a cam groove, and means secured to the said tool supporting member adapted to coöperate with the groove of the said pattern member whereby the position of the tool may be varied from the axis of the chuck spindle synchronously with the rotation thereof.

2. In a boring tool for boring meter casings and the like, the combination with a rotating chuck spindle, of a boring tool, means for adjustably supporting the boring tool whereby it may be moved longitudinally of the axis of the chuck spindle, and means for varying the distance of the boring tool from the axis of the chuck spindle synchronously with the rotation of the chuck spindle, said means comprising a shaft rotatably secured to the said chuck spindle and mounted to rotate independently of the means for supporting the boring tool, a pattern cam secured to the said shaft and rotatable therewith, and means on said support for the boring tool adapted to engage the said pattern cam.

3. In a boring tool for boring meter casings and the like, the combination with a rotating chuck spindle, of a boring tool, means for supporting the boring tool comprising a member mounted to move at approximately right angles to the axis of the chuck spindle and permitting a feeding movement longitudinally of the chuck spindle, a shaft rotatably secured to the chuck spindle, a pattern cam rotatably secured to said shaft, and means on the tool support adapted to engage the said pattern cam whereby the distance of the boring tool from the axis of the chuck spindle may be varied synchronously with the rotation thereof.

4. In a boring tool for boring meter casings and the like, the combination with a rotating chuck spindle, of a shaft rotatably secured to rotate therewith but adapted to have longitudinal movement in relation thereto, a casing in which the said shaft is rotatably secured and being adapted to have a longitudinal feeding movement in relation to the chuck spindle, a pattern member loosely journaled in the said casing and being secured to rotate with the shaft, the said pattern member being provided with a pattern groove, a boring tool adapted to bore an object secured to rotate with the chuck spindle, a support for the boring tool movably mounted on the casing to move in a plane approximately at right angles to the axis of the said chuck spindle and the shaft, the said movable supporting member for the tool being in engagement with the said pattern cam whereby the distance of the boring tool from the axis of the chuck may be varied by the rotation of the chuck spindle.

5. In a boring tool for boring meter casings and the like, the combination with a rotating chuck spindle, of a boring tool, a support for the boring tool adapted to have a feeding movement longitudinally of the chuck spindle, a fixed casing adapted to furnish a sliding support for the member supporting the boring tool, a shaft secured to the chuck spindle and journaled within the said casing, a pattern within the casing rotatably secured to the shaft, the said pattern being provided with a cam groove, and a roller on the tool support in engagement with the said cam groove.

6. In a boring tool for boring meter casings and the like, the combination with a rotating chuck spindle, of a boring tool, a shaft rotatably secured to the said chuck spindle, a casing through which the said shaft passes, a support for the boring tool adapted to have a feeding movement longitudinally of the chuck spindle and being movably mounted in relation to the said casing, a grooved pattern member secured to the said shaft within the casing, a roller secured to the tool support adapted to engage the groove within the said pattern member, and means for adjusting the said roller in relation to the said tool support whereby wear or variation in the cutting surface of the tool may be adjusted.

7. In a boring tool for boring meter casings and the like, the combination with a rotating chuck spindle, a shaft rotatably secured to the chuck spindle and movable longitudinally thereof, a casing adapted to receive the free end of the said shaft and to permit rotation of the shaft in relation to the said casing, a pattern member journaled in the casing and secured to rotate with the said shaft, a boring tool, a support for the boring tool adapted to have a feeding movement longitudinally of said chuck spindle, said support mounted to reciprocate on the face of the said casing at approximately right angles to the axis of the said chuck spindle and shaft, and means on the said support for the tool adapted to engage the pattern member for controlling the said tool support during the rotation of the said pattern member.

8. In a device of the class described, the combination with a rotatable chuck spindle of a shaft movable therewith and longitudinally movable with respect thereto, a tool head adjacent the free end of the shaft and being adapted to have a feeding movement longitudinally of the chuck spindle and shaft, a tool holding member having a slot through which the shaft extends, means for connecting the tool holding member for sliding movement with respect to the fixed tool head, a pattern member fixed to and rotatable with the shaft, and means to engage the tool holding member with the pattern member whereby the former will be slidably moved to correspond with the pattern member.

9. In a boring tool, the combination with a rotatable chuck of a shaft secured thereto and movable longitudinally therewith, a tool head adapted to have a feeding movement longitudinally of the axis of the chuck, a tool holding member having a slot through which the shaft extends, means for supporting the member for sliding movement with respect to the tool head longitudinally of said slot and transversely of the shaft, a pattern member having a laterally opening groove in connection with the shaft and a roller in connection with the tool holding member adapted to engage in the groove to move the tool holding member in accordance with the movement of the grooved pattern member.

10. In a boring tool of the class described, the combination with a rotatable shaft of a pattern member secured thereto having a groove pattern in one face thereof, a tool holding member having a slot therein through which the shaft extends fixed against rotation and slidably movable transversely with respect to the shaft, and means for engagement between the tool holding member and the pattern member in the groove thereof, whereby the tool holding member will be reciprocated transversely with respect to the shaft in accordance with the shape of the groove.

11. A boring tool of the class described comprising a rotatable shaft, a pattern member secured thereto having a pattern groove in one face thereof, a tool holding member having a slot therein and slidable transversely with respect to the shaft in said slot, a cutting tool mounted in the tool holding member at one side of the slot, and means in connection with the tool holding member on the side of the slot opposite the tool, and on a diametrically opposite side of the shaft for engagement in the said groove whereby a reciprocating movement will be imparted to the tool holding member with the cutting tool and the engaging means at inverse distances from the axis of the rotatable shaft.

12. In a boring tool of the class described, the combination with a rotatable shaft of a fixed member in which the shaft is rotatable, a pattern member secured to the shaft and rotatable therewith, a tool holding member slidably connected to the fixed member and having a slot therein through which the shaft extends, a tool disposed on one side of the slot, and an engaging device disposed on the other side of the slot and on the diametrically opposite side of the shaft with respect to the tool for engaging with the pattern member, whereby the cutting tool will be at inverse distance from the axis of the shaft with respect to the device.

In testimony whereof I have signed my name to this specification, in the presence of two subscribing witnesses, on this 7th day of November A. D. 1911.

THOMAS F. MULLIGAN.

Witnesses:
Wm. H. Walker,
H. R. Talmage.

---

Copies of this patent may be obtained for five cents each, by addressing the "Commissioner of Patents, Washington, D. C."